US012382513B2

(12) United States Patent
Zhang et al.

(10) Patent No.: US 12,382,513 B2
(45) Date of Patent: Aug. 5, 2025

(54) CROSS-LINK INTERFERENCE MITIGATION FOR FULL-DUPLEX RANDOM ACCESS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Franklin Park, NJ (US)

(*) Notice: Subject to any disclaimer, the term of this patent is extended or adjusted under 35 U.S.C. 154(b) by 99 days.

(21) Appl. No.: 17/209,851

(22) Filed: Mar. 23, 2021

(65) Prior Publication Data

US 2022/0312504 A1 Sep. 29, 2022

(51) Int. Cl.
*H04W 74/08* (2024.01)
*H04B 7/06* (2006.01)
*H04L 5/00* (2006.01)
*H04L 5/14* (2006.01)
*H04W 72/53* (2023.01)
*H04W 72/56* (2023.01)
*H04W 74/00* (2009.01)
*H04W 74/0833* (2024.01)

(52) U.S. Cl.
CPC ...... *H04W 74/0858* (2013.01); *H04B 7/0626* (2013.01); *H04L 5/0051* (2013.01); *H04L 5/1461* (2013.01); *H04W 72/53* (2023.01); *H04W 72/56* (2023.01); *H04W 74/002* (2013.01)

(58) Field of Classification Search
None
See application file for complete search history.

(56) References Cited

U.S. PATENT DOCUMENTS

| 2018/0049245 | A1* | 2/2018 | Islam | H04W 56/00 |
| 2020/0260497 | A1* | 8/2020 | Ozturk | H04W 72/23 |
| 2021/0135770 | A1* | 5/2021 | Schober | H04L 5/003 |
| 2021/0176794 | A1* | 6/2021 | Mukherjee | H04L 5/0048 |

\* cited by examiner

*Primary Examiner* — Derrick V Rose

(57) ABSTRACT

Various aspects of the present disclosure generally relate to wireless communication. In some aspects, a first user equipment (UE) may receive information indicating a reference signal resource associated with detecting cross-link interference associated with transmitting a random access channel (RACH) message on full duplex resources. The first UE may transmit a RACH message on a selected RACH occasion, wherein the selected RACH occasion is selected based at least in part on whether a reference signal transmitted by a neighbor UE of the first UE has been detected in association with the selected RACH occasion. Numerous other aspects are described.

26 Claims, 13 Drawing Sheets

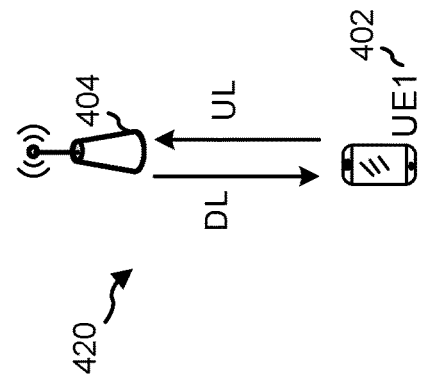
FIG. 4B
FIG. 4C
FIG. 4A

CROSS-LINK INTERFERENCE MITIGATION FOR FULL-DUPLEX RANDOM ACCESS

FIELD OF THE DISCLOSURE

Aspects of the present disclosure generally relate to wireless communication and to techniques and apparatuses for cross-link interference (CLI) mitigation for full-duplex (FD) random access (RA).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving information indicating a reference signal resource associated with detecting cross-link interference associated with transmitting a random access channel (RACH) message on full duplex resources; and transmitting a RACH message on a selected RACH occasion, wherein the selected RACH occasion is selected based at least in part on whether a reference signal transmitted by a neighbor UE of the first UE has been detected in association with the selected RACH occasion.

In some aspects, a method of wireless communication performed by a base station includes transmitting, to a set of first UEs, configuration information configuring a reference signal resource associated with detecting cross-link interference associated with transmitting a RACH message on full duplex resources, wherein the cross-link interference is between the RACH message and downlink communications of the set of first UEs; and transmitting, to a set of second UEs, information indicating the reference signal resource.

In some aspects, a method of wireless communication performed by a first UE includes receiving, from a base station, configuration information indicating a reference signal resource associated with detecting cross-link interference on a downlink communication of the first UE, wherein the cross-link interference is associated with transmission, by a neighbor UE of the first UE, of a RACH message on full duplex resources; and transmitting one or more reference signals on the reference signal resource.

In some aspects, a method of wireless communication performed by a first base station includes detecting a threshold level of interference from a downlink transmission by a second base station, wherein the downlink transmission is on a full-duplex resource in which the downlink transmission and a RACH occasion are duplexed; and disabling the RACH occasion based at least in part on detecting the threshold level of interference from the downlink transmission; or transmitting, to the second base station based at least in part on detecting the threshold level of interference from the downlink transmission, a message indicating to disable the downlink transmission.

In some aspects, a first UE for wireless communication includes a memory and one or more processors, coupled to the memory, configured to: receive information indicating a reference signal resource associated with detecting cross-link interference associated with transmitting a RACH message on full duplex resources; and transmit a RACH message on a selected RACH occasion, wherein the selected RACH occasion is selected based at least in part on whether a reference signal transmitted by a neighbor UE of the first UE has been detected in association with the selected RACH occasion.

In some aspects, a base station for wireless communication includes a memory and one or more processors, coupled to the memory, configured to: transmit, to a set of first UEs, configuration information configuring a reference signal resource associated with detecting cross-link interference associated with transmitting a RACH message on full duplex resources, wherein the cross-link interference is between the RACH message and downlink communications of the set of first UEs; and transmit, to a set of second UEs, information indicating the reference signal resource.

In some aspects, a UE for wireless communication includes a memory and one or more processors, coupled to the memory, configured to: receive from a base station, configuration information indicating a reference signal resource associated with detecting cross-link interference on a downlink communication of the first UE, wherein the cross-link interference is associated with transmission of a RACH message on full duplex resources; and transmit one or more reference signals on the reference signal resource.

In some aspects, a first base station for wireless communication includes a memory and one or more processors, coupled to the memory, configured to: detect a threshold level of interference from a downlink transmission by a second base station, wherein the downlink transmission is on a full-duplex resource in which the downlink transmission and a RACH occasion are duplexed; and disable the RACH occasion based at least in part on detecting the threshold level of interference from the downlink transmission; or transmit, to the second base station based at least in part on detecting the threshold level of interference from the downlink transmission, a message indicating to disable the downlink transmission.

In some aspects, a non-transitory computer-readable medium storing a set of instructions for wireless communication includes one or more instructions that, when executed by one or more processors of a UE, cause the UE to: receive information indicating a reference signal resource associated with detecting cross-link interference associated with transmitting a RACH message on full duplex resources; and transmit a RACH message on a selected RACH occasion, wherein the selected RACH occasion is selected based at least in part on whether a reference signal transmitted by a neighbor UE of the first UE has been detected in association with the selected RACH occasion.

In some aspects, a non-transitory computer-readable medium storing a set of instructions for wireless communication includes one or more instructions that, when executed by one or more processors of a base station, cause the base station to: transmit, to a set of first UEs, configuration information configuring a reference signal resource associated with detecting cross-link interference associated with transmitting a RACH message on full duplex resources, wherein the cross-link interference is between the RACH message and downlink communications of the set of first UEs; and transmit, to a set of second UEs, information indicating the reference signal resource.

In some aspects, a non-transitory computer-readable medium storing a set of instructions for wireless communication includes one or more instructions that, when executed by one or more processors of a UE, cause the UE to: receive from a base station, configuration information indicating a reference signal resource associated with detecting cross-link interference on a downlink communication of the first UE, wherein the cross-link interference is associated with transmission of a RACH message on full duplex resources; and transmit one or more reference signals on the reference signal resource.

In some aspects, a non-transitory computer-readable medium storing a set of instructions for wireless communication includes one or more instructions that, when executed by one or more processors of a first base station, cause the first base station to: detect a threshold level of interference from a downlink transmission by a second base station, wherein the downlink transmission is on a full-duplex resource in which the downlink transmission and a RACH occasion are duplexed; and disable the RACH occasion based at least in part on detecting the threshold level of interference from the downlink transmission; or transmit, to the second base station based at least in part on detecting the threshold level of interference from the downlink transmission, a message indicating to disable the downlink transmission.

In some aspects, an apparatus for wireless communication includes means for receiving information indicating a reference signal resource associated with detecting cross-link interference associated with transmitting a RACH message on full duplex resources; and means for transmitting a RACH message on a selected RACH occasion, wherein the selected RACH occasion is selected based at least in part on whether a reference signal transmitted by a neighbor UE of the apparatus has been detected in association with the selected RACH occasion.

In some aspects, an apparatus for wireless communication includes means for transmitting, to a set of first UEs, configuration information configuring a reference signal resource associated with detecting cross-link interference associated with transmitting a RACH message on full duplex resources, wherein the cross-link interference is between the RACH message and downlink communications of the set of first UEs; and means for transmitting, to a set of second UEs, information indicating the reference signal resource.

In some aspects, an apparatus for wireless communication includes means for receiving, from a base station, configuration information indicating a reference signal resource associated with detecting cross-link interference on a downlink communication of the first apparatus, wherein the cross-link interference is associated with transmission of a RACH message on full duplex resources; and means for transmitting one or more reference signals on the reference signal resource.

In some aspects, an apparatus for wireless communication includes means for detecting a threshold level of interference from a downlink transmission by a base station, wherein the downlink transmission is on a full-duplex resource in which the downlink transmission and a RACH occasion are duplexed; and means for disabling the RACH occasion based at least in part on detecting the threshold level of interference from the downlink transmission; and/or means for transmitting, to the second base station based at least in part on detecting the threshold level of interference from the downlink transmission, a message indicating to disable the downlink transmission.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
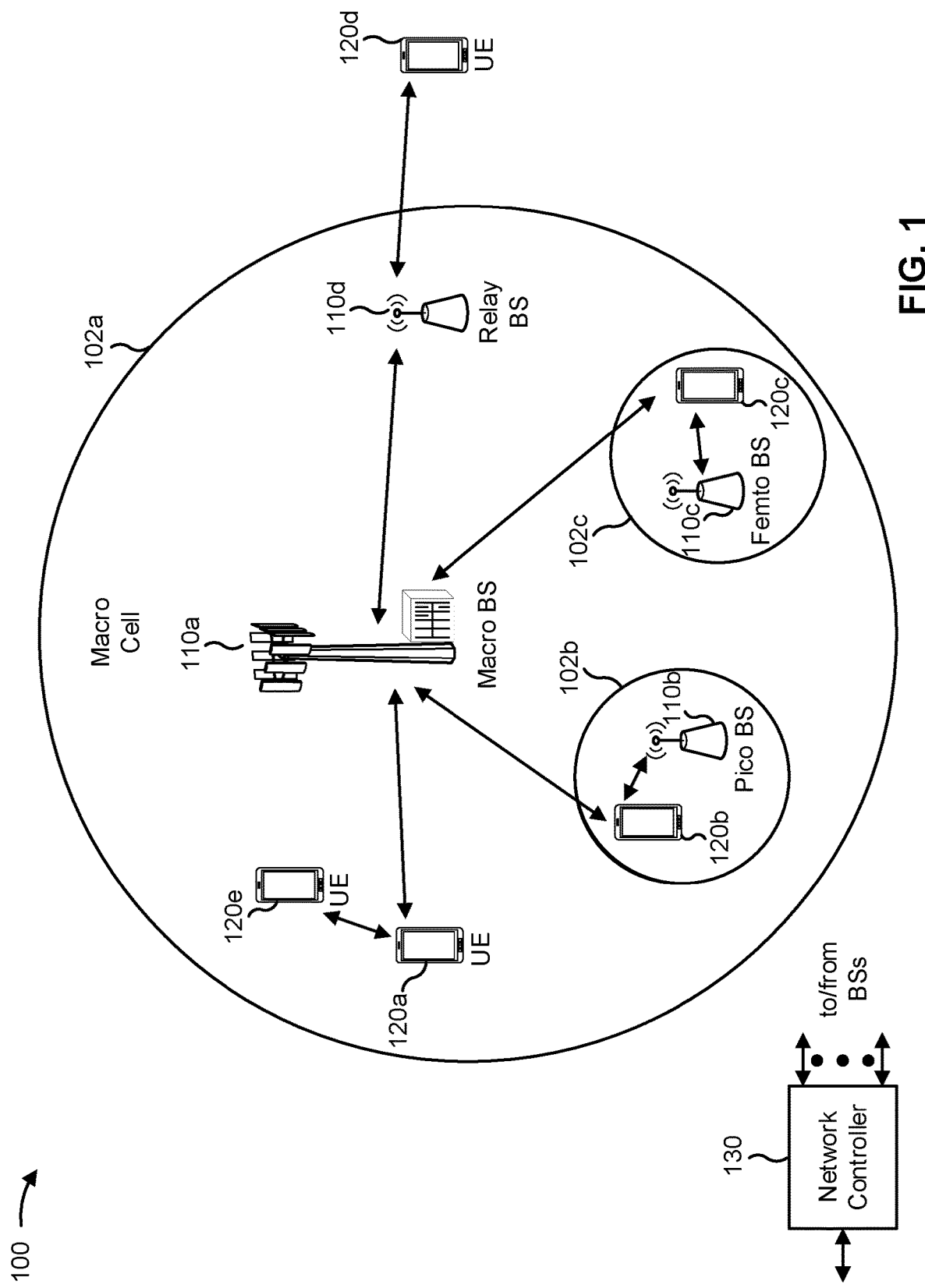
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
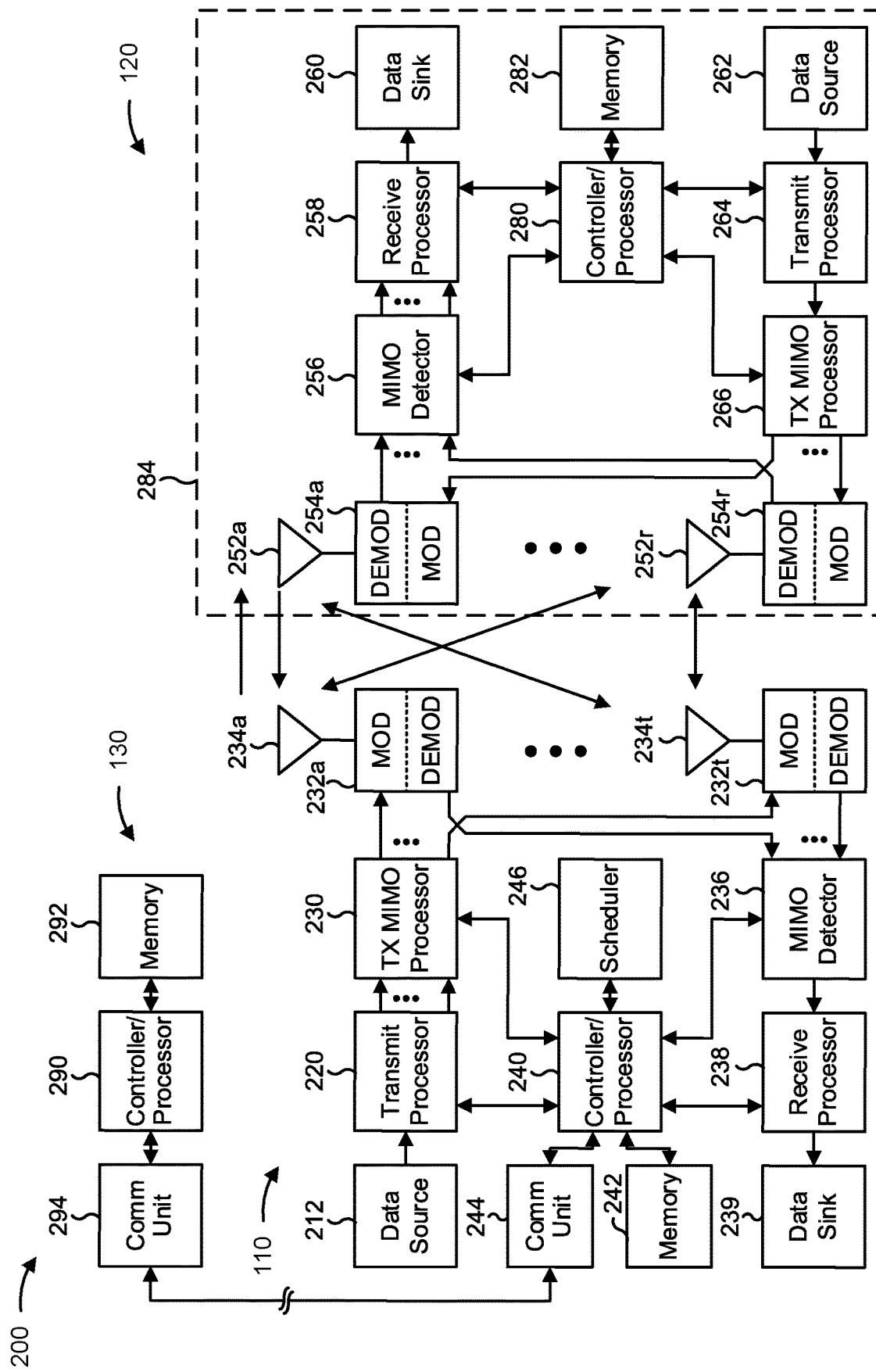
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-11).

Controller/processor 240 of base station 110, controller/processor 280 of UE 120, and/or any other component(s) of FIG. 2 may perform one or more techniques associated with cross-link interference (CLI) mitigation for full-duplex (FD) random access (RA), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE includes means for receiving information indicating a reference signal resource associated with detecting cross-link interference associated with transmitting a random access channel (RACH) message on full duplex resources; and/or means for transmitting a RACH message on a selected RACH occasion, wherein the selected RACH occasion is selected based at least in part on whether a reference signal transmitted by a neighbor UE of the first UE has been detected in association with the selected RACH occasion. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a set of first UEs, configuration information configuring a reference signal resource associated with detecting cross-link interference associated with transmitting a RACH message on full duplex resources, wherein the cross-link interference is between the RACH message and downlink communications of the set of first UEs; and/or means for transmitting, to a set of second UEs, information indicating the reference signal resource. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the first UE includes means for receiving, from a base station, configuration information indicating a reference signal resource associated with detecting cross-link interference on a downlink communication of the first UE, wherein the cross-link interference is associated with transmission, by a neighbor UE of the first UE, of a RACH message on full duplex resources; and/or means for transmitting one or more reference signals on the reference signal resource. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first base station includes means for detecting a threshold level of interference from a downlink transmission by a second base station, wherein the downlink transmission is on a full-duplex resource in which the downlink transmission and a RACH occasion are duplexed; and/or means for disabling the RACH occasion based at least in part on detecting the threshold level of interference from the downlink transmission; and/or means for transmitting, to the second base station based at least in part on detecting the threshold level of interference from the downlink transmission, a message indicating to disable the downlink transmission. The means for the first base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
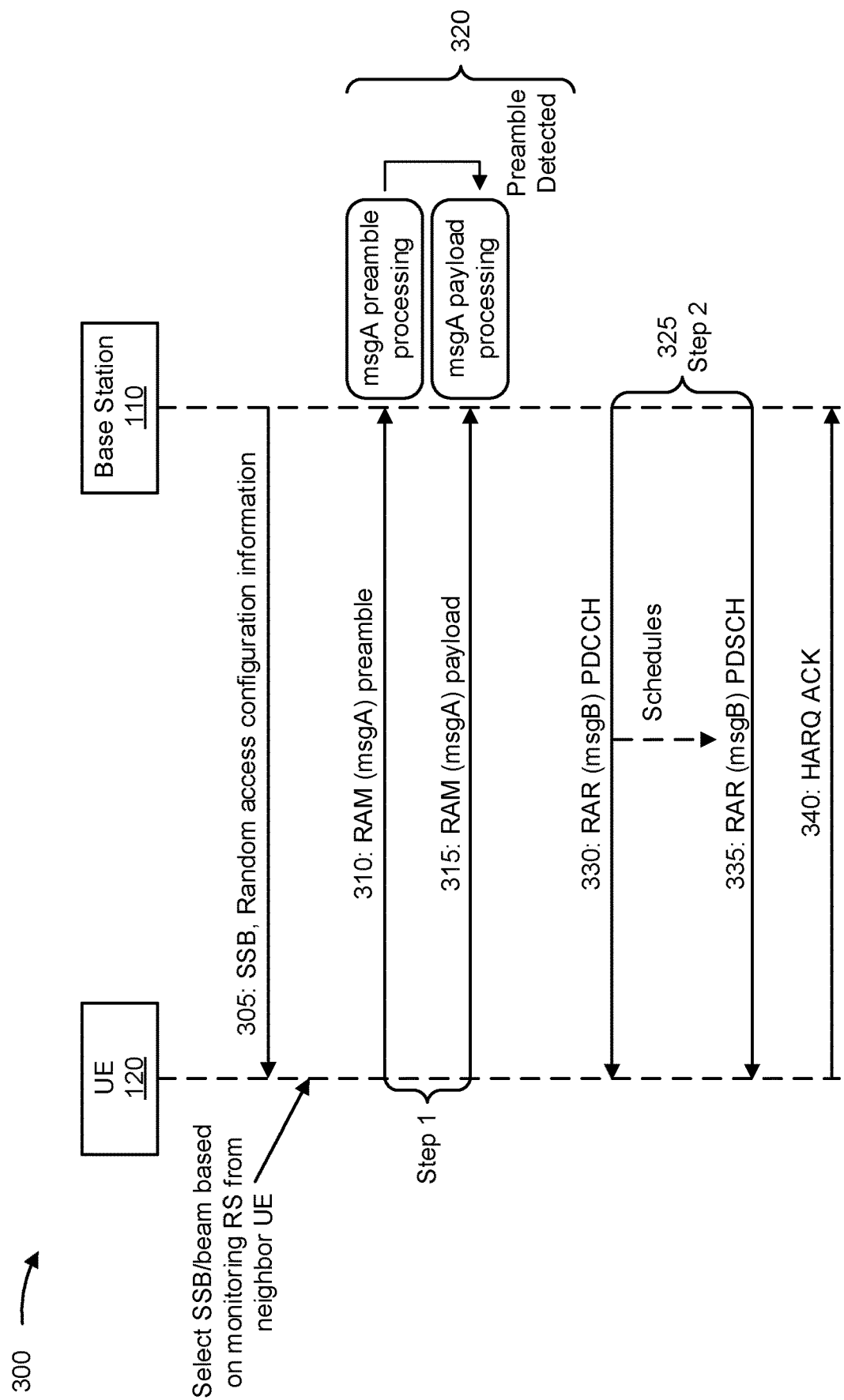
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

In some aspects, the random access configuration information may indicate a RACH occasion for a RAM. A RACH occasion is an area specified in time and frequency that is available for the transmission of a RACH preamble. In LTE, there is only one RACH occasion specified by an RRC message (via SIB2) for all RACH preambles. In some radio access technologies such as NR, the SSB is transmitted via a beam corresponding to the SSB. The UE 120 may select a beam for transmission of a physical random access channel (PRACH) based at least in part on an SSB received via the beam. A mapping may be defined between SSBs and RACH occasions (ROs). The UE may use the RO mapped to the SSB to transmit the RAM. By detecting which RO is used to transmit the RAM, the base station 110 can determine which SSB/beam the UE has selected. Some ROs may be associated with full-duplex (FD) resources, in which an RO can be shared with another communication such as an SSB.

Techniques and apparatuses described herein provide for monitoring, by UE 120, of likely cross-link interference based at least in part on a reference signal transmitted by another UE (e.g., a neighbor UE served by the same base station 110 as the UE 120). The UE 120 may select an RO, or may determine not to use an FD RO, based at least in part on detecting the likely cross-link interference. In this way, interference from RACH message transmission is reduced, which improves the efficacy of FD communication and reliability of downlink communications on FD resources.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all of the contents of message 1 (e.g., a PRACH preamble), and the RAM payload may include some or all of the contents of message 3 (e.g., a UE identifier, uplink control information (UCI), and/or a physical uplink shared channel (PUSCH) transmission).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 330, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

Example 330 illustrates a two-step RACH procedure. In some cases, a UE 120 and a base station 110 may perform a four-step RACH procedure. In the four-step RACH procedure, the msgA may be split into a preamble and a payload that are transmitted separately from each other as a RACH msg1 and a RACH msg3. The msgB may be split into a RACH msg2 that acknowledges RACH msg1 and provides scheduling information for RACH msg3, and a RACH msg4 that provides a reply to RACH msg3. The techniques described herein are applicable for two-step RACH and for four-step RACH.

As indicated above, FIG. 3 is provided as an example. Other examples may differ from what is described with regard to FIG. 3.

FIGS. 4A-4C are diagrams illustrating examples 400, 410, 420 of full duplex (FD) communication in accordance with the present disclosure. The usage of FD communication enables latency reduction, spectrum efficiency enhancement, and more efficient resource utilization. The example 400 of FIG. 4A includes a UE1 402 and two base stations (e.g., TRPs) 404-1, 404-2, wherein the UE1 402 is sending UL transmissions to base station 404-1 and is receiving DL transmissions from base station 404-2. In the example 400 of FIG. 4A, FD is enabled for the UE1 402, but not for the base stations 404-1, 404-2.

The example 410 of FIG. 4B includes two UEs, UE1 402-1 and UE2 402-2, and a base station 404, wherein the UE1 402-1 is receiving a DL transmission from the base station 404 and the UE2 402-2 is transmitting a UL transmission to the base station 404. In the example 410 of FIG. 4B, FD is enabled for the base station 404, but not for the UEs UE1 402-1 and UE2 402-2. For example, the base station 404 may perform uplink reception using a first antenna panel and downlink transmission using a second antenna panel. Thus, the base station 404 may be associated with FD resources, and the UE1 402-1 and the UE2 402-2 may be configured with half-duplex resources corresponding to the FD resources. For example, the UE1 402-2 may transmit a RACH message, such as a RACH preamble, on a resource that is an FD resource at the base station 404. In some aspects, the RACH message may be duplexed with a communication for the UE1 402-1, such as a downlink communication (e.g., a physical downlink shared channel, a physical downlink control channel, a synchronization signal block, a channel state information reference signal, or the like).

As mentioned above, in an FD mode, a RACH occasion can overlap in time with a downlink communication, which enables more efficient system resource usage and lower latency. One type of duplexed RACH occasion is a frequency division multiplexed (FDMed) RACH occasion, in which a RACH occasion and an SSB overlap in time and in spatial configuration (e.g., beam, transmission configuration indication state, quasi-colocation parameter), and are separated from each other in frequency by a guard band. Another type of duplexed RACH occasion is a spatial division multiplexed (SDMed) RACH occasion, in which a RACH occasion and an SSB overlap in frequency and in time, and are differentiated by transmission using different spatial configurations. However, the usage of duplexed RACH occasions may lead to interference of RACH messages with downlink communications that use FD resources multiplexed with a RACH occasion, which may lead to violation of quality of service requirements associated with such downlink communications, diminished throughput, and suboptimal resource usage.

Techniques and apparatuses described herein provide for determination, by a UE performing initial access, of whether transmission of a RACH message on a RACH occasion associated with a full duplex resource is likely to cause cross link interference for reception of a communication that is FDMed or SDMed with the RACH occasion, and selection of a RACH occasion accordingly. In this way, reliability and performance of FD downlink communications is improved, versatility of FD resources is improved, and throughput is increased.

In some cases, transmissions of a first base station may cause CLI on an FD resource associated with a RACH occasion of a second base station. For example, a downlink transmission by a first base station may occupy a downlink resource that is duplexed with a RACH occasion of the second base station. In this case, the downlink transmission may cause failure of a RACH procedure utilizing the RACH occasion, which slows the connection of UEs to the network, and which may cause failure of RACH related procedures such as beam recovery, initial access, and so on.

Techniques and apparatuses described herein provide for determination, by a first base station, that interference from a second base station associated with an FD resource having a RACH occasion satisfies a threshold. The first base station may disable the RACH occasion associated with the interference, or may transmit an indication to the second base station to disable or reconfigure a downlink transmission causing the interference. In this way, reliability of the RACH procedure is improved, thereby speeding connection of UEs to the network and improving reliability of RACH related procedures such as beam recovery, initial access, and so on.

The example 420 of FIG. 4C includes a UE1 402 and a base station 404, wherein the UE1 402 is receiving a DL transmission from the base station 404 and the UE1 402 is transmitting a UL transmission to the base station 404. In the example 420 of FIG. 4C, FD is enabled for both the UE1 402 and the base station 404.

As indicated above, FIGS. 4A-4C are provided as one or more examples. Other examples may differ from what is described with regard to FIGS. 4A-4C.

Figure 5:
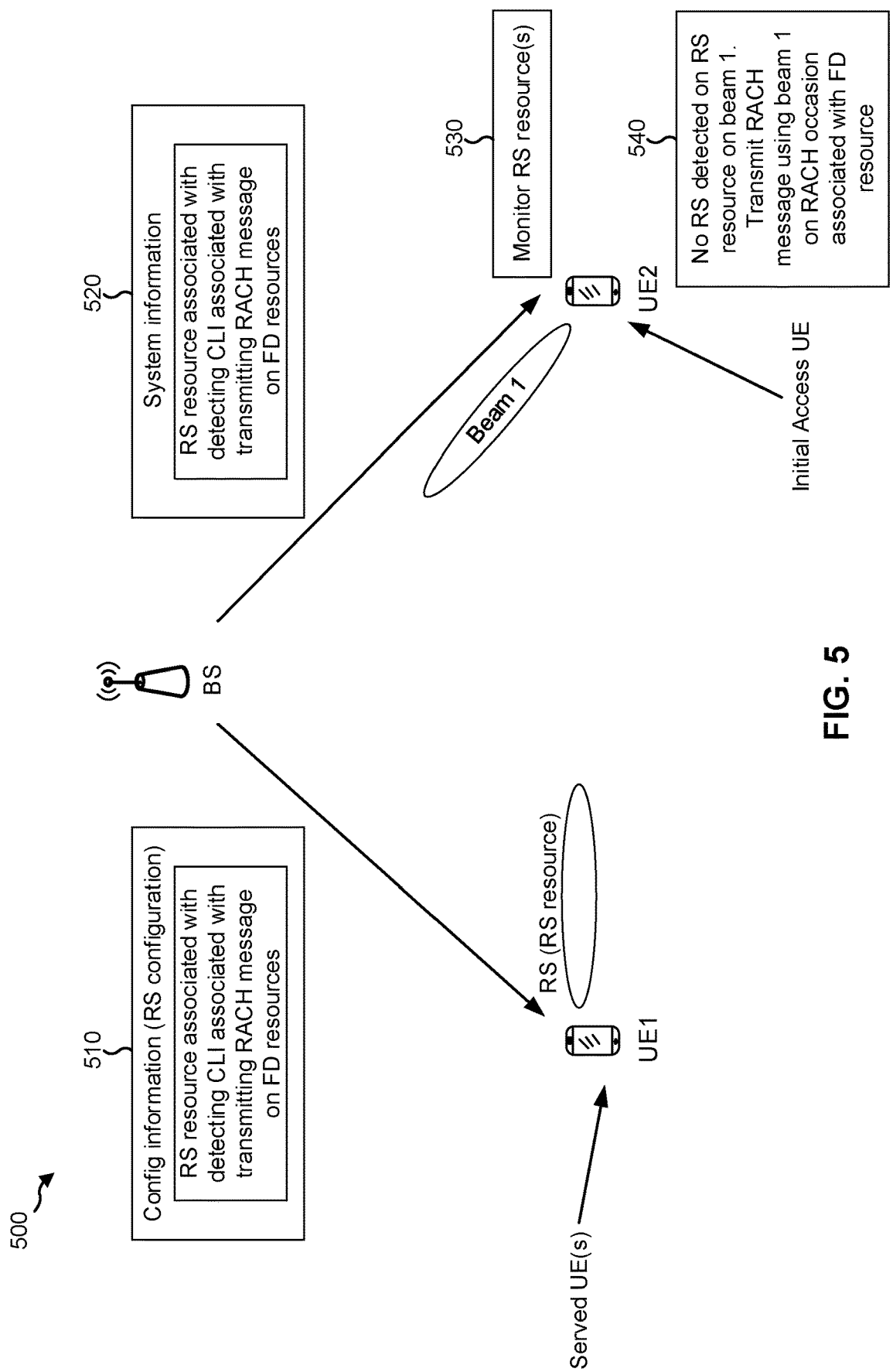
FIG. 5 is a diagram illustrating an example of selection of a RACH occasion for a RACH procedure based at least in part on monitoring for a reference signal transmitted by a neighbor UE, in accordance with the present disclosure.

FIG. 5 is a diagram illustrating an example 500 of selection of a RACH occasion for a RACH procedure based at least in part on monitoring for a reference signal transmitted by a neighbor UE, in accordance with the present disclosure. As shown, example 500 includes a BS (e.g., BS 110, base station 404), a UE1 (e.g., UE 120, UE1 402-1), and a UE2 (e.g., UE 120, UE2 402-2). As shown, UE1 is a served UE. A served UE is a UE served by the BS. For example, each UE for which the BS provides a serving cell may be considered a served UE. In some aspects, a served UE may be referred to as a neighbor UE of the initial access UE. As further shown, UE2 is an initial access UE. That is, UE2 is a UE that has determined to perform an initial access procedure (such as a RACH procedure) with the BS. In some aspects, UE2 may not be associated with an active connection (e.g., a radio resource control (RRC) connection or the like) with the BS.

As shown by reference number 510, the BS may transmit configuration information to the UE1. As further shown, the configuration information may include a uplink reference signal (RS) configuration. An RS configuration indicates parameters for transmission of an uplink RS by a served UE. For example, an uplink RS configuration may include a sounding RS (SRS) configuration or a configuration associated with another type of RS. In some aspects, the RS configuration may be for an uplink RS. In some aspects, the RS configuration may indicate an RS resource for transmission of an RS by the served UE. For example, the RS configuration may identify an RS resource associated with detecting cross-link interference (CLI) associated with transmitting RACH messages on FD resources. "CLI" refers to interference caused by one device with regard to a link of another device. For example, an uplink transmission of an initial access UE may cause CLI with regard to a downlink reception of a served UE. CLI may be exacerbated by the usage of FD resources for communications, such as for transmission of a RACH message by an initial access UE on an FD resource associated with a downlink communication of a served UE.

In some aspects, the RS resource may be periodic. For example, the RS resource may recur every X slots, where X is an integer. In some aspects, the RS resource may occupy the same symbol of each slot in which the RS resource is transmitted for all configured served UEs. In some aspects, the RS configuration may indicate a sequence for the RS. For example, the sequence may be the same for each served UE configured with the RS configuration, which reduces complexity of detecting the RS by initial access UEs who are trying to connect with the base station.

In some aspects, the BS may configure each served UE of the BS with the RS configuration, which may conserve processing resources of the BS that would otherwise be used to select a subset of served UEs for configuration. In some aspects, the BS may select a subset, such as a proper subset, of served UEs to configure with the uplink RS configuration. For example, the BS may select the subset based at least in part on a priority of traffic associated with the subset (e.g., the BS may select UEs associated with downlink communications that have a threshold priority, thereby protecting high priority traffic from CLI). As another example, the BS may select the subset based at least in part on the subset being associated with downlink communications (e.g., the BS may select UEs that are associated with any downlink communication). As yet another example, the BS may select the subset based at least in part on location information, such as information indicating that the subset of served UEs are within a threshold distance of the initial access UE, within a cell associated with the initial access UE, or the like. Selecting the subset of served UEs may reduce overhead associated with configuring all served UEs of the BS.

As shown by reference number 520, the BS may transmit system information indicating the RS resource. For example, the BS may broadcast the system information, and the system information may be received by the initial access UE. In some aspects, the system information may be remaining minimum system information (RMSI), also referred to as SIB 1. The system information may indicate the RS resource. For example, the system information may indicate at least one of a time resource, a frequency resource, or a spatial resource associated with the RS resource. In some aspects, the system information may indicate a time/frequency resource and a spatial configuration for an RS. For example, the system information may indicate an association between a time/frequency resource and a spatial configuration, and a corresponding FD RACH occasion. In this case, the system information may indicate not to select a particular beam associated with the spatial configuration for transmission of a RACH message if an RS reference signal received power (RSRP) is larger than a predefined threshold on the particular beam at the time/frequency resource. As another example, the system information may indicate an association between a time/frequency resource and a spatial configuration, and all FD RACH occasions. In this case, the system information may indicate not to select any FD RACH occasion for transmission of a RACH message if an RS RSRP is larger than a predefined threshold on the particular beam at the time/frequency resource.

As shown by reference number 530, the initial access UE may monitor one or more RS resources for an RS. As shown by reference number 540, the served UE may transmit an RS on the RS resource. For example, the served UE may transmit the RS in accordance with the RS configuration. The initial access UE may determine whether the RS is received on the RS resource. If the initial access UE detects the RS on the RS resource, then the initial access UE may determine that transmission of a RACH message using a beam associated with the RS resource is likely to cause CLI with regard to a downlink communication of the neighbor UE, and may therefore not select the beam for transmission of the RACH message on a RACH occasion associated with an FD resource. As shown by reference number 540, if the initial access UE does not detect the RS on the RS resource (in example 500, on Beam 1), then the initial access UE may select a beam associated with the RS resource (Beam 1) for transmission of a RACH message, and may transmit the RACH message on a RACH occasion associated with an FD resource. Thus, the transmission of and monitoring for the RS may reduce CLI, since it is likely that the RACH message will not cause interference with the downlink communication if the RS is not detected by the initial access UE.

Figure 6:
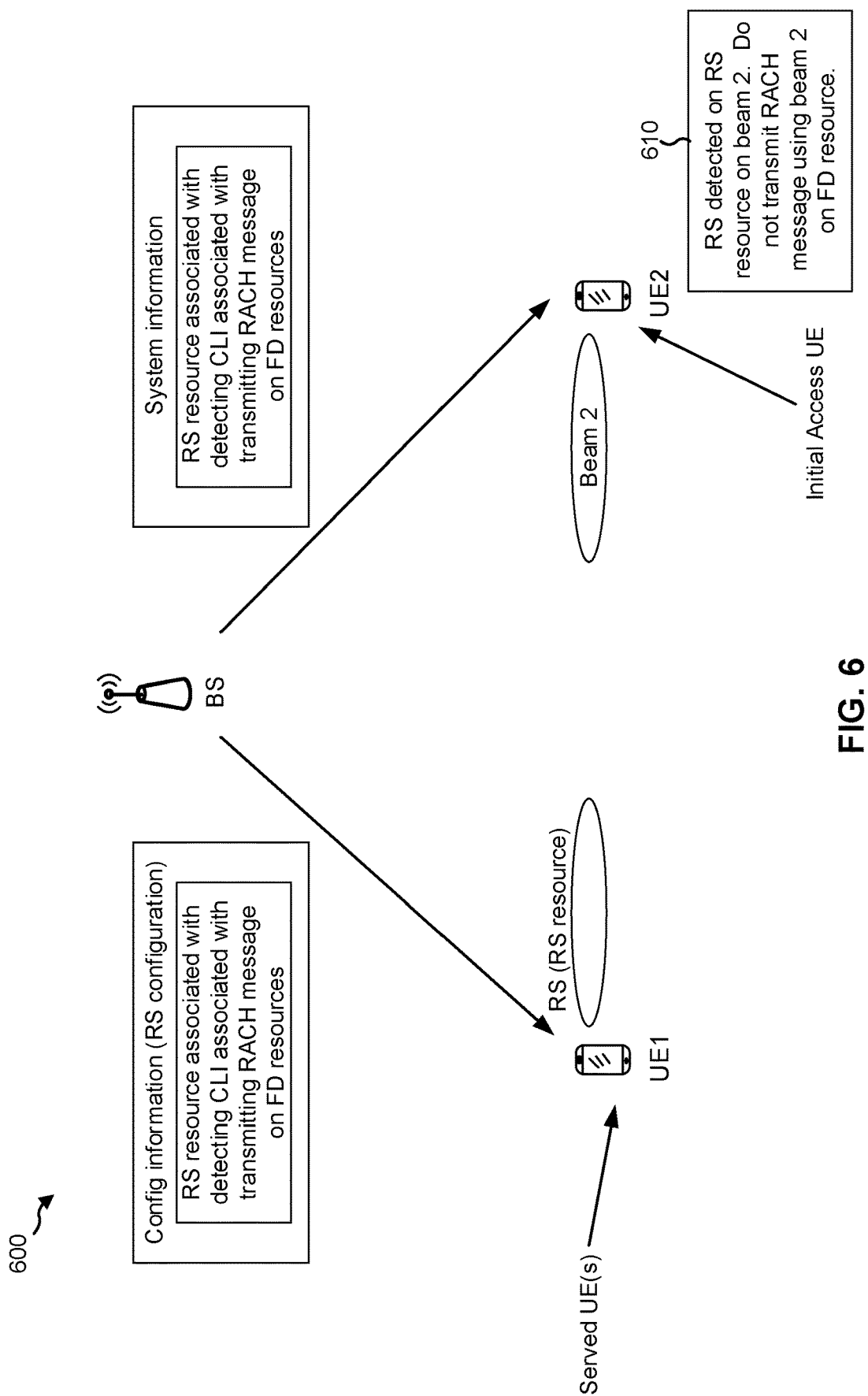
FIG. 6 is a diagram illustrating another example of selection of a RACH occasion for a RACH procedure based at least in part on monitoring for a reference signal transmitted by a neighbor UE, in accordance with the present disclosure.

FIG. 6 is a diagram illustrating another example 600 of selection of a RACH occasion for a RACH procedure based at least in part on monitoring for a reference signal transmitted by a neighbor UE, in accordance with the present disclosure. In example 600, the transmission of the configuration information and the system information are as described in connection with FIG. 5. As shown by reference number 610, in example 600, the initial access UE detects the RS on the RS resource on a beam (e.g., Beam 2). In some aspects, the initial access UE may detect the RS based at least in part on a threshold, such as a threshold received power of the RS. Based at least in part on detecting the RS on the RS resource, the initial access UE determines not to transmit the RACH message on a RACH occasion associated with Beam 2. In this way, the initial access UE avoids creating CLI on an FD resource associated with a downlink communication to one or more served UEs, which improves reliability of the downlink communication and throughput of the BS and the one or more served UEs which have high priority downlink (DL) transmissions.

In some aspects, the base station may not configure the configuration information, and/or may not broadcast information indicating RS locations. In this case, the initial access UE may determine that the RACH message is prioritized. Therefore, the UE may transmit the RACH message on a selected beam irrespective of whether the selected beam is associated with an FD RACH occasion or whether the RACH message on the selected beam would cause CLI with regard to the downlink communication.

As indicated above, FIGS. 5 and 6 are provided as one or more examples. Other examples may differ from what is described with regard to FIGS. 5 and 6.

Figure 7:
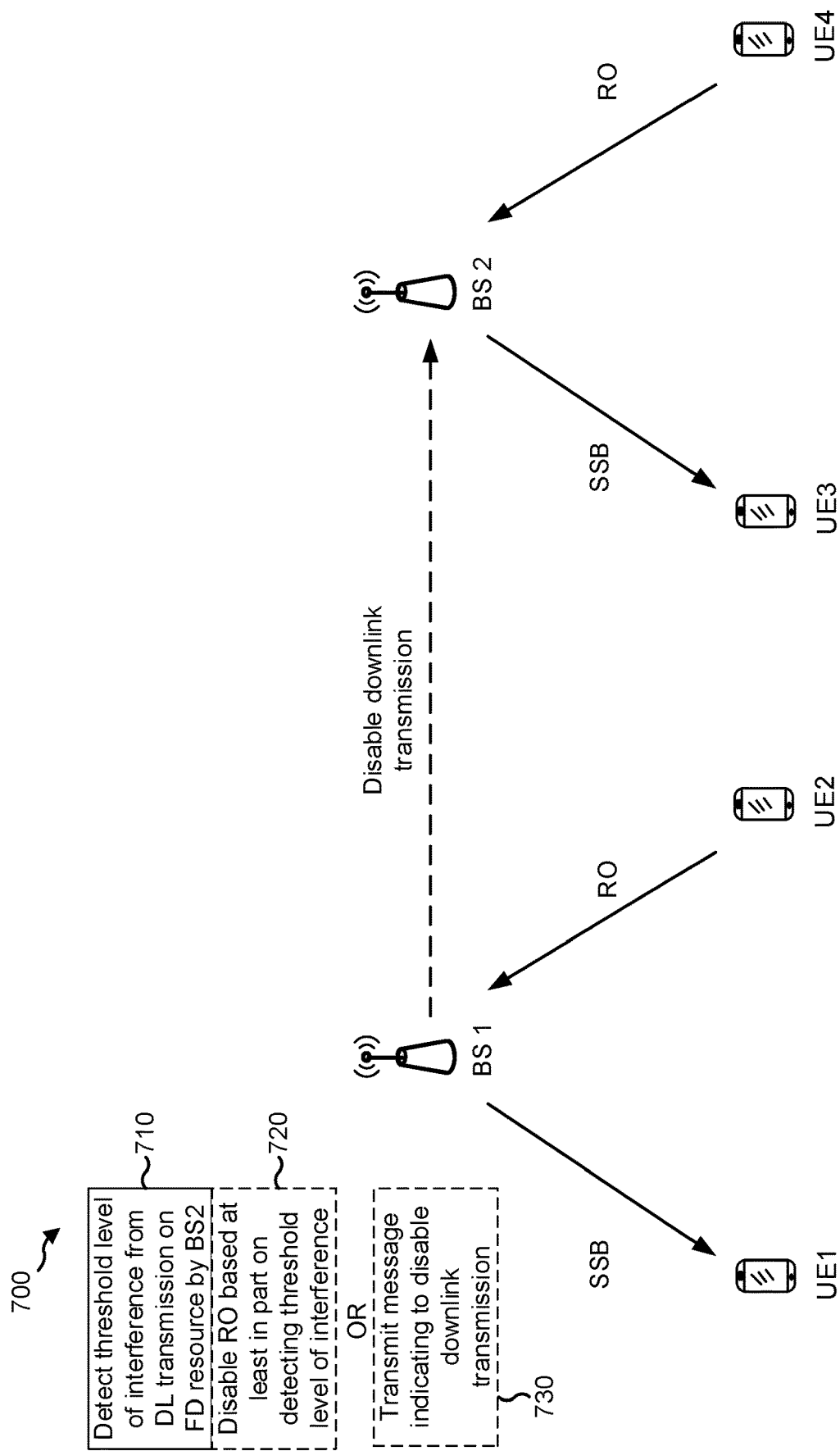
FIG. 7 is a diagram illustrating an example of mitigation of CLI between a first base station and a second base station for an FD resource, in accordance with the present disclosure.

FIG. 7 is a diagram illustrating an example 700 of mitigation of CLI between a first base station and a second base station for an FD resource, in accordance with the present disclosure. As shown, example 700 includes a BS1 (e.g., BS 110, BS 404) and a BS2. BS1 is associated with a UE1 and a UE2 (e.g., UEs 120, UE1 402-1 and UE2 402-2), and BS2 is associated with a UE3 and a UE4 (e.g., UEs 120, UE1 402-1 and UE2 402-2). In some aspects, UE1 and UE2 may be served UEs of BS1, and UE3 and UE4 may be served UEs of BS2. The dashed boxes around steps 720 and 730 indicates that one of step 720 and step 730 may be performed (e.g., that steps 720 and 730 are alternatives of each other).

As shown by reference number 710, BS1 may detect a threshold level of interference from a downlink transmission on an FD resource by BS2. For example, the downlink transmission may include a PDSCH, a PDCCH, a channel state information reference signal, an SSB, or the like. The FD resource may be associated with the downlink transmission and a RACH occasion. For example, the downlink transmission and the RACH occasion may be duplexed (e.g., FDMed or SDMed) in the FD resource. In some aspects, the threshold level of interference may indicate that a RACH attempt using the RACH occasion is unlikely to be successful. For example, the threshold level of interference may be sufficient to cause reception, by the BS1, of a RACH message on the RACH occasion to fail.

The threshold level of interference may be measured, for example, via cross link interference (CLI) handling procedures or remote interference management (RIM) procedures. In some aspects, the threshold level of interference may be based at least in part on a base station side measurement, such as a CLI RSRP or a CLI received signal strength indicator (RSSI).

As shown by reference number 720, based at least in part on detecting the threshold level of interference, in some aspects, the BS1 may disable the RACH occasion. For example, the BS1 may cease transmitting an SSB associated with the RACH occasion. As another example, the BS1 may configure the RACH occasion to map to a different resource than the FD resource, such as a half-duplex resource.

As shown by reference number 730, in other aspects, the BS1 may transmit a message indicating to disable the downlink transmission. For example, the BS1 may transmit the message to the BS2. In some aspects, the BS1 may transmit the message via a backhaul interface. In some aspects, the message may indicate to disable the downlink transmission. In some aspects, the message may indicate to change a resource associated with the downlink transmission. In some aspects, the message may indicate to change a configuration associated with the downlink transmission, such as a transmit power, a beam direction, or the like. The BS2 may disable the downlink transmission, change the resource associated with the downlink transmission, change the configuration associated with the downlink transmission, or the like, based at least in part on the message. In this way, interference with a RACH occasion on an FD resource of the BS1 is reduced, which improves the likelihood of successful RACH procedures, thereby increasing throughput and reducing latency associated with initial access.

As indicated above, FIG. 7 is provided as an example. Other examples may differ from what is described with regard to FIG. 7.

Figure 8:
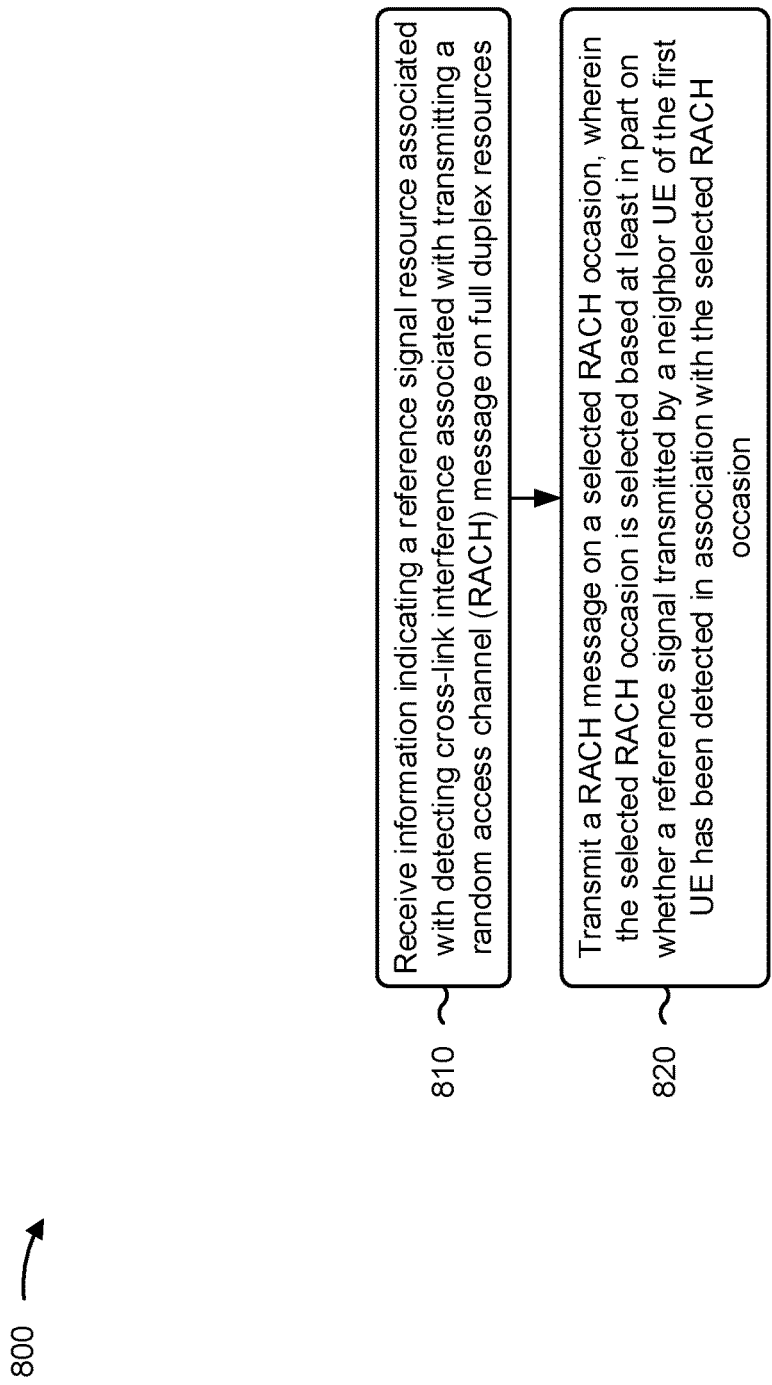
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the first UE (e.g., UE 120, UE2 of FIG. 4B, UE2 of FIG. 5, UE2 of FIG. 6) performs operations associated with cross-link interference mitigation for full-duplex random access.

As shown in FIG. 8, in some aspects, process 800 may include receiving information indicating a reference signal resource associated with detecting cross-link interference associated with transmitting a RACH message on full duplex resources (block 810). For example, the first UE (e.g., using reception component 1202, depicted in FIG. 12) may receive information indicating a reference signal resource associated with detecting cross-link interference associated with transmitting a RACH message on full duplex resources, as described above.

As further shown in FIG. 8, in some aspects, process 800 may include transmitting a RACH message on a selected RACH occasion, wherein the selected RACH occasion is selected based at least in part on whether a reference signal transmitted by a neighbor UE of the first UE has been detected in association with the selected RACH occasion (block 820). For example, the first UE (e.g., using transmission component 1204, depicted in FIG. 12) may transmit a RACH message on a selected RACH occasion, wherein the selected RACH occasion is selected based at least in part on whether a reference signal transmitted by a neighbor UE of the first UE has been detected in association with the selected RACH occasion, as described above.

Process 800 may include additional aspects, such as any single aspect or any combination of aspects described below and/or in connection with one or more other processes described elsewhere herein.

In a first aspect, the selected RACH occasion is a full-duplex RACH occasion that overlaps with a resource for a downlink communication of the neighbor UE to a base station associated with the selected RACH occasion.

In a second aspect, alone or in combination with the first aspect, process 800 includes selecting (e.g., using RACH selection component 1208, depicted in FIG. 12) the selected RACH occasion based at least in part on the first UE having received no reference signal associated with a synchronization signal block or channel state information reference signal beam mapped to the selected RACH occasion.

In a third aspect, alone or in combination with one or more of the first and second aspects, process 800 includes receiving (e.g., using reception component 1202, depicted in FIG. 12) a reference signal associated with a synchronization signal block or channel state information reference signal beam that is associated with a particular RACH occasion, wherein the selected RACH occasion is not the particular RACH occasion based at least in part on the first UE having received the reference signal that is associated with the particular RACH occasion.

In a fourth aspect, alone or in combination with one or more of the first through third aspects, the information indicating the reference signal resource is received via system information broadcasted by a base station.

In a fifth aspect, alone or in combination with one or more of the first through fourth aspects, the information indicating the reference signal resource indicates at least one of time resources, frequency resources, or spatial resources associated with the reference signal resource.

In a sixth aspect, alone or in combination with one or more of the first through fifth aspects, the RACH message is associated with initial access.

In a seventh aspect, alone or in combination with one or more of the first through sixth aspects, the reference signal resource is for a sounding reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
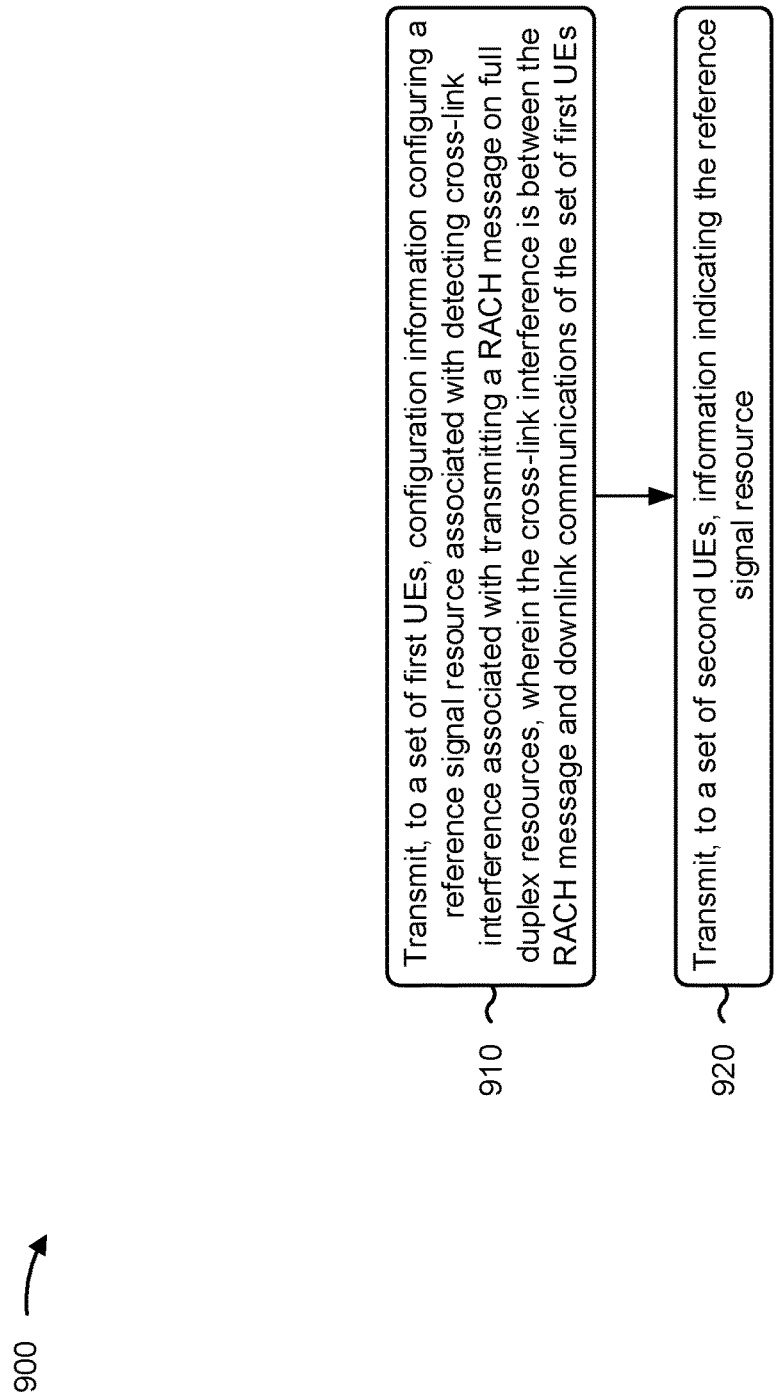
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110, base station 404, the BS of FIGS. 5 and 6) performs operations associated with cross-link interference mitigation for FD random access.

As shown in FIG. 9, in some aspects, process 900 may include transmitting, to a set of first UEs, configuration information configuring a reference signal resource associated with detecting cross-link interference associated with transmitting a RACH message on full duplex resources, wherein the cross-link interference is between the RACH message and downlink communications of the set of first UEs (block 910). For example, the base station (e.g., using transmission component 1304, depicted in FIG. 13) may transmit, to a set of first UEs, configuration information configuring a reference signal resource associated with detecting cross-link interference associated with transmitting a RACH message on full duplex resources, wherein the cross-link interference is between the RACH message and downlink communications of the set of first UEs, as described above.

As further shown in FIG. 9, in some aspects, process 900 may include transmitting, to a set of second UEs, information indicating the reference signal resource (block 920). For example, the base station (e.g., using transmission component 1304, depicted in FIG. 13) may transmit, to a set of second UEs, information indicating the reference signal resource, as described above. The set of second UEs described with regard to FIG. 9 may include one or more of the first UEs described with regard to FIG. 8. The set of first UEs described with regard to FIG. 9 may include one or more of the first UEs described with regard to FIG. 10.

Process 900 may include additional aspects, such as any single aspect or any combination of aspects described below and/or in connection with one or more other processes described elsewhere herein.

In a first aspect, the downlink communications are associated with a threshold priority level.

In a second aspect, alone or in combination with the first aspect, the reference signal resource comprises a same set of resources for each of the set of first UEs.

In a third aspect, alone or in combination with one or more of the first and second aspects, the reference signal resource is a periodic resource.

In a fourth aspect, alone or in combination with one or more of the first through third aspects, reference signals configured for the set of first UEs are associated with a same sequence.

In a fifth aspect, alone or in combination with one or more of the first through fourth aspects, process 900 includes selecting (e.g., using selection component 1308, depicted in FIG. 13) the set of first UEs based at least in part on at least one of the downlink communications being associated with a threshold priority level, the set of first UEs being associated with the downlink communications, or location information associated with the set of first UEs.

In a sixth aspect, alone or in combination with one or more of the first through fifth aspects, a RACH occasion associated with the RACH message overlaps with a downlink communication resource of the set of first UEs in at least one of frequency, or spatial configuration.

In a seventh aspect, alone or in combination with one or more of the first through sixth aspects, process 900 includes receiving (e.g., using reception component 1302, depicted in FIG. 13) a RACH message from a second UE, of the set of second UEs, on a RACH occasion based at least in part on the second UE having detected no reference signal associated with the reference signal resource on a beam associated with the RACH occasion, and performing an initial access operation with the second UE based at least in part on the RACH message.

In an eighth aspect, alone or in combination with one or more of the first through seventh aspects, the information indicating the reference signal resource is transmitted via system information broadcasted by the base station, and the configuration information is transmitted via configuration signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
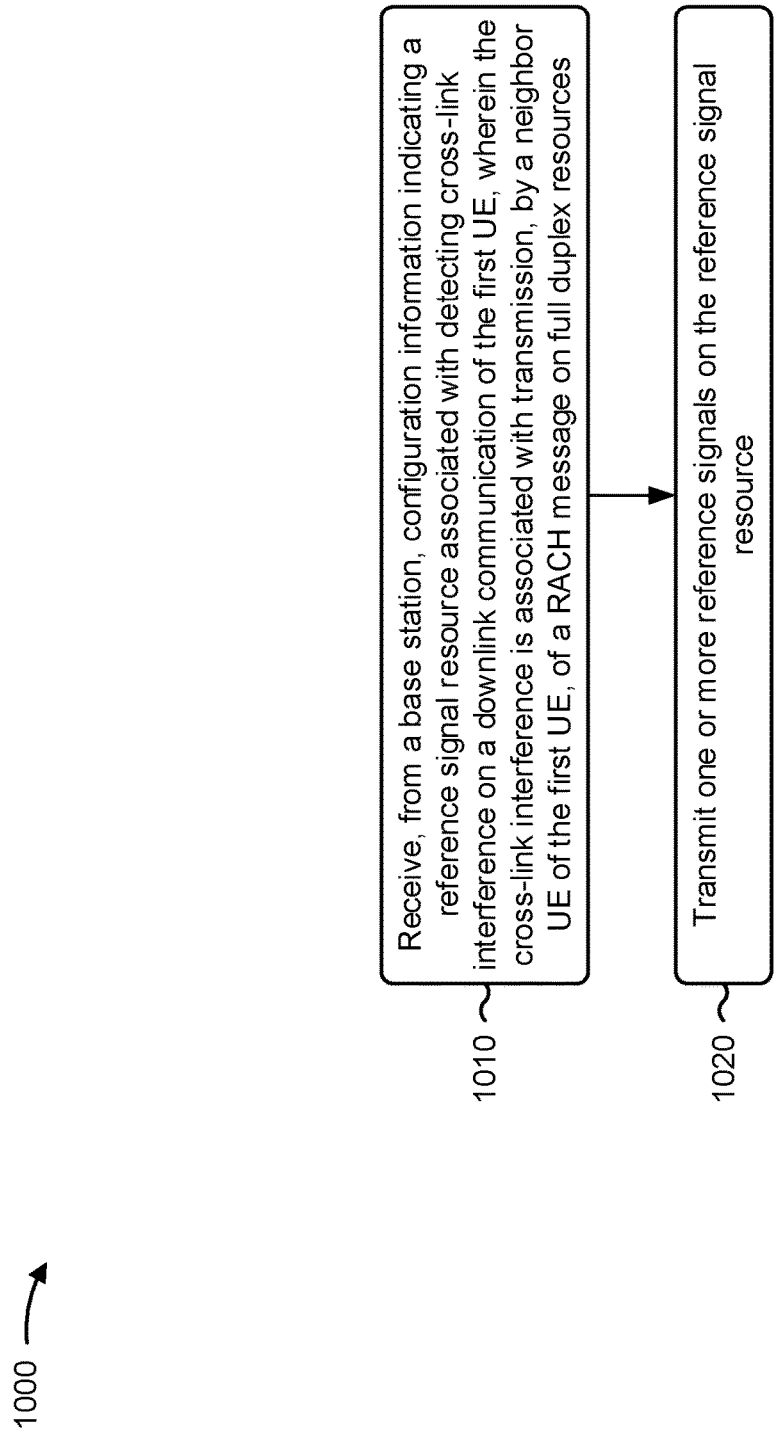
FIG. 10 is a diagram illustrating an example process performed, for example, by a first UE, in accordance with the present disclosure.

FIG. 10 is a diagram illustrating an example process 1000 performed, for example, by a first UE, in accordance with the present disclosure. Example process 1000 is an example where the first UE (e.g., UE 120) performs operations associated with cross-link interference mitigation for FD random access.

As shown in FIG. 10, in some aspects, process 1000 may include receiving, from a base station, configuration information indicating a reference signal resource associated with detecting cross-link interference on a downlink communication of the first UE, wherein the cross-link interference is associated with transmission, by a neighbor UE of the first UE, of a RACH message on full duplex resources (block 1010). For example, the first UE (e.g., using reception component 1202, depicted in FIG. 12) may receive, from a base station, configuration information indicating a reference signal resource associated with detecting cross-link interference on a downlink communication of the first UE, wherein the cross-link interference is associated with transmission, by a neighbor UE (e.g., an initial access UE) of the first UE, of a RACH message on full duplex resources, as described above.

As further shown in FIG. 10, in some aspects, process 1000 may include transmitting one or more reference signals on the reference signal resource (block 1020). For example, the first UE (e.g., using transmission component 1204, depicted in FIG. 12) may transmit one or more reference signals on the reference signal resource, as described above.

Process 1000 may include additional aspects, such as any single aspect or any combination of aspects described below and/or in connection with one or more other processes described elsewhere herein.

In a first aspect, the downlink communication is associated with a threshold priority level.

In a second aspect, alone or in combination with the first aspect, the reference signal resource is periodic.

In a third aspect, alone or in combination with one or more of the first and second aspects, the one or more reference signals are associated with a specified sequence.

In a fourth aspect, alone or in combination with one or more of the first through third aspects, receiving the configuration information is based at least in part on at least one of the downlink communication being associated with a threshold priority level, the first UE being associated with the downlink communication, or location information associated with the first UEs.

In a fifth aspect, alone or in combination with one or more of the first through fourth aspects, the downlink communication overlaps with the transmission of the RACH message in at least one of frequency, or spatial configuration.

In a sixth aspect, alone or in combination with one or more of the first through fifth aspects, the configuration information is received via configuration signaling.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
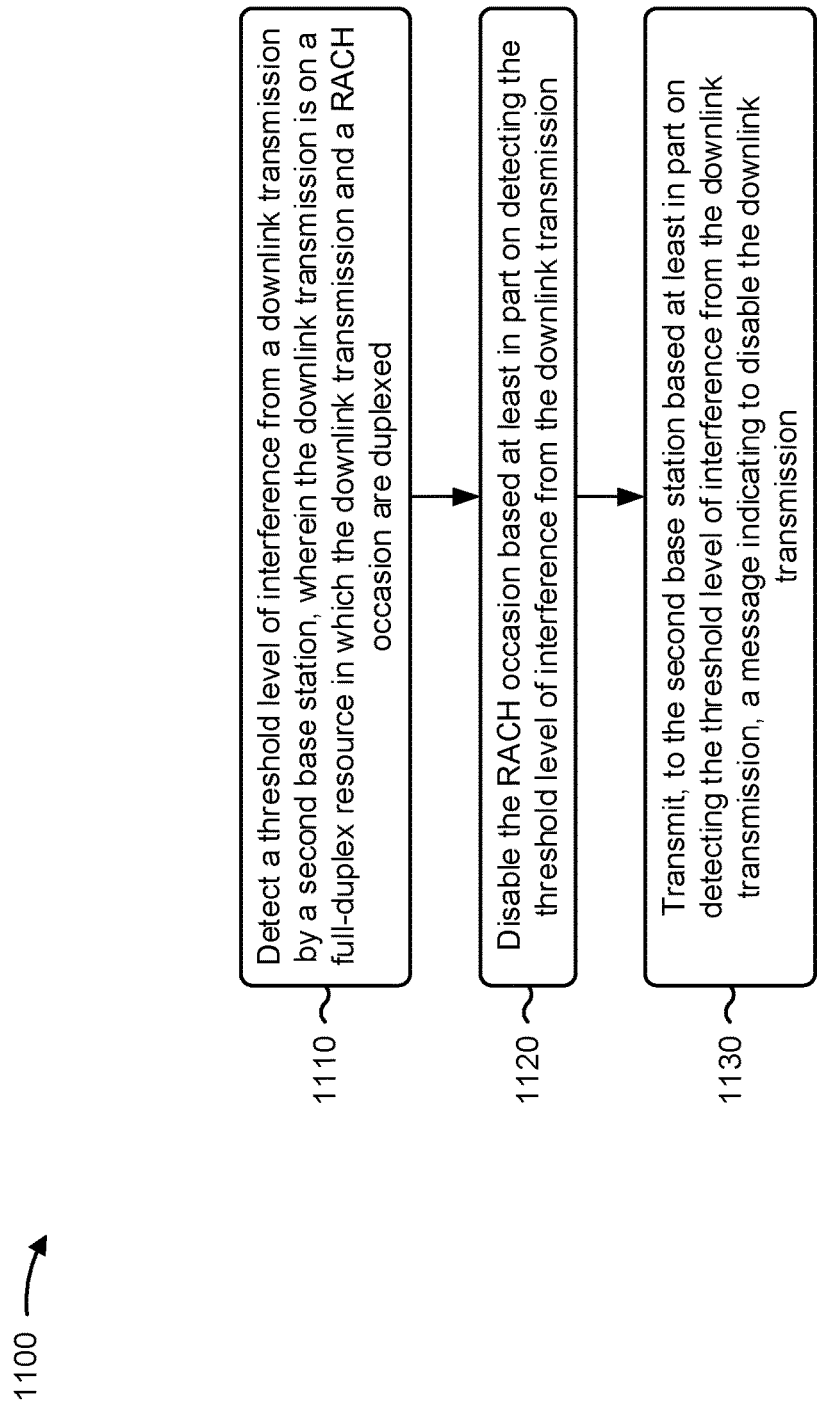
FIG. 11 is a diagram illustrating an example process performed, for example, by a first base station, in accordance with the present disclosure.

FIG. 11 is a diagram illustrating an example process 1100 performed, for example, by a first base station, in accordance with the present disclosure. Example process 1100 is an example where the first base station (e.g., base station 110) performs operations associated with cross-link interference mitigation for FD random access.

As shown in FIG. 11, in some aspects, process 1100 may include detecting a threshold level of interference from a downlink transmission by a second base station, wherein the downlink transmission is on a full-duplex resource in which the downlink transmission and a RACH occasion are duplexed (block 1110). For example, the first base station (e.g., using detection component 1310, depicted in FIG. 13) may detect a threshold level of interference from a downlink transmission by a second base station, wherein the downlink transmission is on a full-duplex resource in which the downlink transmission and a RACH occasion are duplexed, as described above.

As further shown in FIG. 11, in some aspects, process 1100 may include disabling the RACH occasion based at least in part on detecting the threshold level of interference from the downlink transmission (block 1120). For example, the first base station (e.g., using transmission component 1304, depicted in FIG. 13) may disable the RACH occasion based at least in part on detecting the threshold level of interference from the downlink transmission, as described above.

As further shown in FIG. 11, in some aspects, process 1100 may include transmitting, to the second base station based at least in part on detecting the threshold level of interference from the downlink transmission, a message indicating to disable the downlink transmission (block 1130). For example, the first base station (e.g., using transmission component 1304, depicted in FIG. 13) may transmit, to the second base station based at least in part on detecting the threshold level of interference from the downlink transmission, a message indicating to disable the downlink transmission, as described above.

Process 1100 may include additional aspects, such as any single aspect or any combination of aspects described below and/or in connection with one or more other processes described elsewhere herein.

In a first aspect, the downlink transmission is at least one of a synchronization signal block, a physical downlink shared channel, a physical downlink control channel, or a channel state information reference signal.

In a second aspect, alone or in combination with the first aspect, the message is transmitted via non-access stratum signaling between the first base station and the second base station.

In a third aspect, alone or in combination with one or more of the first and second aspects, the threshold level of interference is sufficient to cause reception of a RACH message on the RACH occasion to fail.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
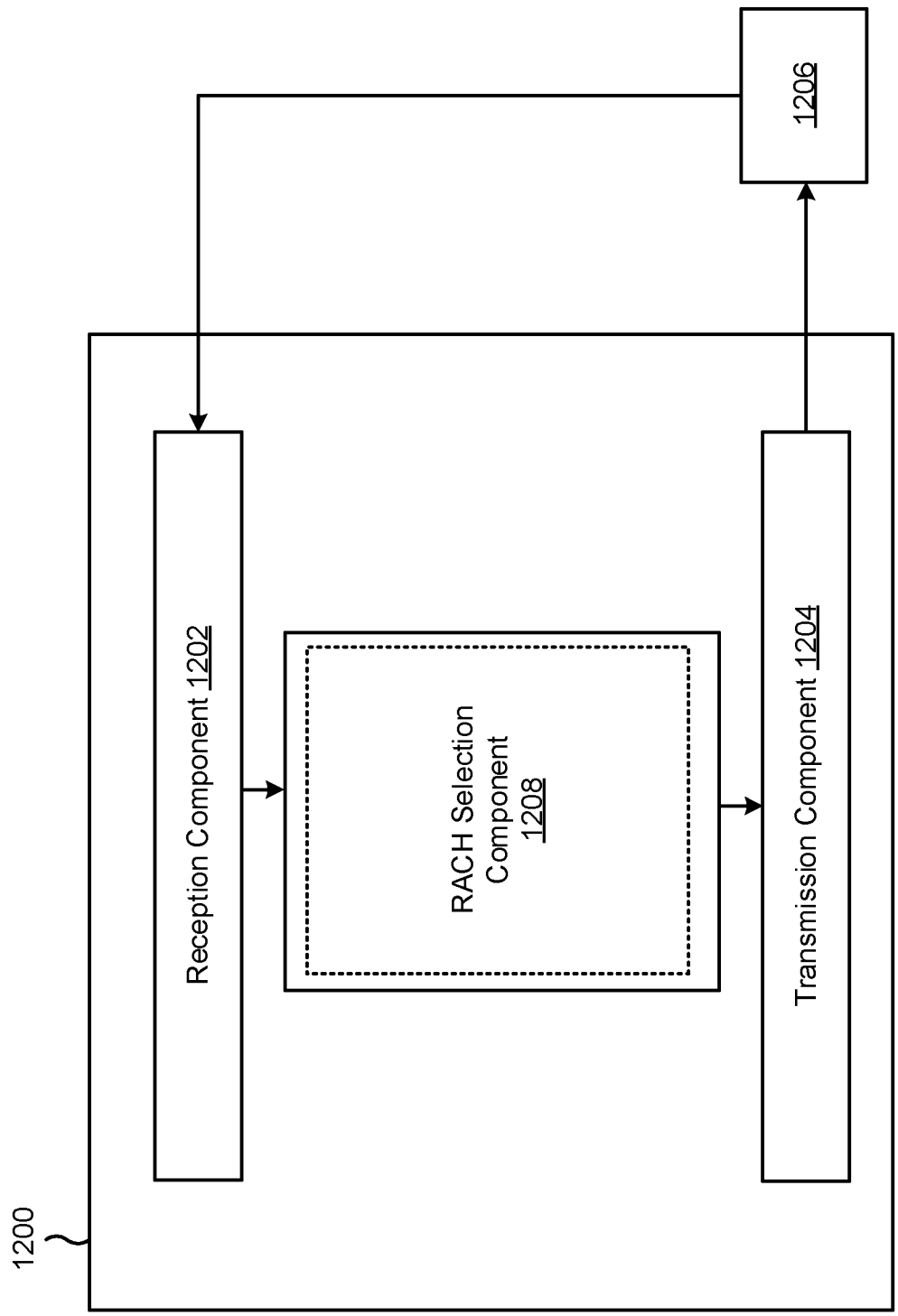
FIG. 12 is a block diagram of an example apparatus for wireless communication in accordance with the present disclosure.

FIG. 12 is a block diagram of an example apparatus 1200 for wireless communication in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a RACH selection component 1208, among other examples.

In some aspects, the apparatus 1200 may be configured to perform one or more operations described herein in connection with FIGS. 3-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the reception component 1202 may receive information indicating a reference signal resource associated with detecting cross-link interference associated with transmitting a RACH message on full duplex resources. The transmission component 1204 may transmit a RACH message on a selected RACH occasion, wherein the selected RACH occasion is selected based at least in part on whether a reference signal transmitted by a neighbor UE of the first UE has been detected in association with the selected RACH occasion.

In some aspects, the RACH selection component 1208 may select the selected RACH occasion based at least in part on the first UE having received no reference signal associated with a synchronization signal block or channel state information reference signal beam mapped to the selected RACH occasion.

In some aspects, the reception component 1202 may receive a reference signal associated with a synchronization signal block or channel state information reference signal beam that is associated with a particular RACH occasion, wherein the selected RACH occasion is not the particular RACH occasion based at least in part on the first UE having received the reference signal that is associated with the particular RACH occasion.

The reception component 1202 may receive, from a base station, configuration information indicating a reference signal resource associated with detecting cross-link interference on a downlink communication of the first UE, wherein the cross-link interference is associated with transmission of a RACH message on full duplex resources. The transmission component 1204 may transmit one or more reference signals on the reference signal resource.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
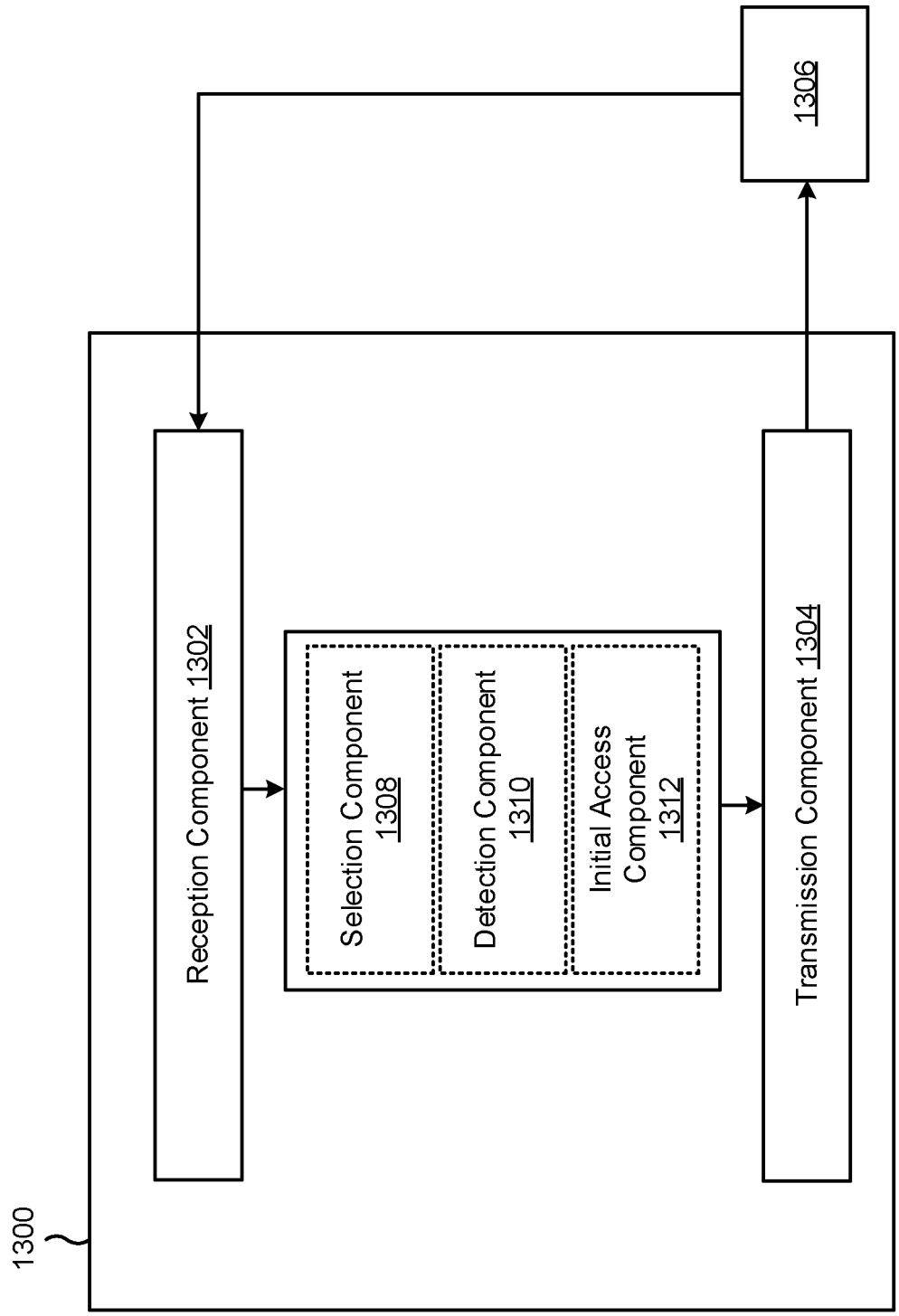
FIG. 13 is a block diagram of an example apparatus for wireless communication in accordance with the present disclosure.

FIG. 13 is a block diagram of an example apparatus 1300 for wireless communication in accordance with the present disclosure. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a selection component 1308, a detection component 1310, or an initial access component 1312, among other examples.

In some aspects, the apparatus 1300 may be configured to perform one or more operations described herein in connection with FIGS. 3-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit, to a set of first UEs, configuration information configuring a reference signal resource associated with detecting cross-link interference associated with transmitting a RACH message on full duplex resources, wherein the cross-link interference is between the RACH message and downlink communications of the set of first UEs. The transmission component 1304 may transmit, to a set of second UEs, information indicating the reference signal resource.

The selection component 1308 may select the set of first UEs based at least in part on at least one of the downlink communications being associated with a threshold priority level, the set of first UEs being associated with the downlink communications, or location information associated with the set of first UEs.

The reception component 1302 may receive a RACH message from a second UE, of the set of second UEs, on a RACH occasion based at least in part on the second UE having detected no reference signal associated with the reference signal resource on a beam associated with the RACH occasion.

The initial access component 1312 may perform an initial access operation with the second UE based at least in part on the RACH message.

The reception component 1302 may detect a threshold level of interference from a downlink transmission by a second base station, wherein the downlink transmission is on a full-duplex resource in which the downlink transmission and a RACH occasion are duplexed. The transmission component 1304 may disable the RACH occasion based at least in part on detecting the threshold level of interference from the downlink transmission. The transmission component 1304 may transmit, to the second base station based at least in part on detecting the threshold level of interference from the downlink transmission, a message indicating to disable the downlink transmission.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving information indicating a reference signal resource associated with detecting cross-link interference associated with transmitting a random access channel (RACH) message on full duplex resources; and transmitting a RACH message on a selected RACH occasion, wherein the selected RACH occasion is selected based at least in part on whether a reference signal transmitted by a neighbor UE of the first UE has been detected in association with the selected RACH occasion.

Aspect 2: The method of Aspect 1, wherein the selected RACH occasion is a full-duplex RACH occasion that overlaps with a resource for a downlink communication of the neighbor UE to a base station associated with the selected RACH occasion.

Aspect 3: The method of Aspect 1, further comprising: selecting the selected RACH occasion based at least in part on the first UE having received no reference signal associated with a synchronization signal block or channel state information reference signal beam mapped to the selected RACH occasion.

Aspect 4: The method of Aspect 1, further comprising: receiving a reference signal associated with a synchronization signal block or channel state information reference signal beam that is associated with a particular RACH occasion, wherein the selected RACH occasion is not the particular RACH occasion based at least in part on the first UE having received the reference signal that is associated with the particular RACH occasion.

Aspect 5: The method of Aspect 1, wherein the information indicating the reference signal resource is received via system information broadcasted by a base station.

Aspect 6: The method of Aspect 1, wherein the information indicating the reference signal resource indicates at least one of time resources, frequency resources, or spatial resources associated with the reference signal resource.

Aspect 7: The method of Aspect 1, wherein the RACH message is associated with initial access.

Aspect 8: The method of Aspect 1, wherein the reference signal resource is for a sounding reference signal.

Aspect 9: A method of wireless communication performed by a base station, comprising: transmitting, to a set of first user equipments (UEs), configuration information configuring a reference signal resource associated with detecting cross-link interference associated with transmitting a random access channel (RACH) message on full duplex resources, wherein the cross-link interference is between the RACH message and downlink communications of the set of first UEs; and transmitting, to a set of second UEs, information indicating the reference signal resource.

Aspect 10: The method of Aspect 9, wherein the downlink communications are associated with a threshold priority level.

Aspect 11: The method of Aspect 9, wherein the reference signal resource comprises a same set of resources for each of the set of first UEs.

Aspect 12: The method of Aspect 9, wherein the reference signal resource is a periodic resource.

Aspect 13: The method of Aspect 9, wherein reference signals configured for the set of first UEs are associated with a same sequence.

Aspect 14: The method of Aspect 9, further comprising: selecting the set of first UEs based at least in part on at least one of: the downlink communications being associated with a threshold priority level, the set of first UEs being associated with the downlink communications, or location information associated with the set of first UEs.

Aspect 15: The method of Aspect 9, wherein a RACH occasion associated with the RACH message overlaps with a downlink communication resource of the set of first UEs in at least one of: frequency, or spatial configuration.

Aspect 16: The method of Aspect 9, further comprising: receiving a RACH message from a second UE, of the set of second UEs, on a RACH occasion based at least in part on the second UE having detected no reference signal associated with the reference signal resource on a beam associated with the RACH occasion; and performing an initial access operation with the second UE based at least in part on the RACH message.

Aspect 17: The method of Aspect 9, wherein the information indicating the reference signal resource is transmitted via system information broadcasted by the base station, and wherein the configuration information is transmitted via configuration signaling.

Aspect 18: A method of wireless communication performed by a first user equipment (UE), comprising: receiving, from a base station, configuration information indicating a reference signal resource associated with detecting cross-link interference on a downlink communication of the first UE, wherein the cross-link interference is associated with transmission, by a neighbor UE of the first UE, of a random access channel (RACH) message on full duplex resources; and transmitting one or more reference signals on the reference signal resource.

Aspect 19: The method of Aspect 18, wherein the downlink communication is associated with a threshold priority level.

Aspect 20: The method of Aspect 18, wherein the reference signal resource is periodic.

Aspect 21: The method of Aspect 18, wherein the one or more reference signals are associated with a specified sequence.

Aspect 22: The method of Aspect 18, wherein receiving the configuration information is based at least in part on at least one of: the downlink communication being associated with a threshold priority level, the first UE being associated with the downlink communication, or location information associated with the first UEs.

Aspect 23: The method of Aspect 18, wherein the downlink communication overlaps with the transmission of the RACH message in at least one of: frequency, or spatial configuration.

Aspect 24: The method of Aspect 18, wherein the configuration information is received via configuration signaling.

Aspect 25: A method of wireless communication performed by a first base station, comprising: detecting a threshold level of interference from a downlink transmission by a second base station, wherein the downlink transmission is on a full-duplex resource in which the downlink transmission and a random access channel (RACH) occasion are duplexed; and disabling the RACH occasion based at least in part on detecting the threshold level of interference from the downlink transmission; or transmitting, to the second base station based at least in part on detecting the threshold level of interference from the downlink transmission, a message indicating to disable the downlink transmission.

Aspect 26: The method of Aspect 25, wherein the downlink transmission is at least one of: a synchronization signal block, a physical downlink shared channel, a physical downlink control channel, or a channel state information reference signal.

Aspect 27: The method of Aspect 25, wherein the message is transmitted via non-access stratum signaling between the first base station and the second base station.

Aspect 28: The method of Aspect 25, wherein the threshold level of interference is sufficient to cause reception of a RACH message on the RACH occasion to fail.

Aspect 29: An apparatus for wireless communication at a device, comprising a processor; memory coupled with the processor; and instructions stored in the memory and executable by the processor to cause the apparatus to perform the method of one or more Aspects of Aspects 1-28.

Aspect 30: A device for wireless communication, comprising a memory and one or more processors coupled to the memory, the memory and the one or more processors configured to perform the method of one or more Aspects of Aspects 1-28.

Aspect 31: An apparatus for wireless communication, comprising at least one means for performing the method of one or more Aspects of Aspects 1-28.

Aspect 32: A non-transitory computer-readable medium storing code for wireless communication, the code comprising instructions executable by a processor to perform the method of one or more Aspects of Aspects 1-28.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, from a network node, remaining minimum system information indicating:
      an association, between a time and frequency resource and a spatial configuration, associated with a reference signal resource associated with detecting cross-link interference associated with transmitting a random access channel (RACH) message on full duplex resources, and
      a full-duplex RACH occasion corresponding to the association;
   transmitting the RACH message on the full-duplex RACH occasion in a frequency division multiplex (FDM) mode when the first UE does not detect a reference signal, associated with a synchronization signal block or a channel state information reference signal beam, on the reference signal resource that overlaps in time with the full-duplex RACH occasion; and
   transmitting the RACH message on a second RACH occasion in the FDM mode, different from the full-duplex RACH occasion, when the first UE detects the reference signal that overlaps in time with the full-duplex RACH occasion.

2. The method of claim 1, wherein the full-duplex RACH occasion overlaps with a resource for a downlink communication of a neighbor UE to the network node.

3. The method of claim 1, further comprising:
   selecting the full-duplex RACH occasion based at least in part on the first UE having received no reference signal associated with the synchronization signal block.

4. The method of claim 1, further comprising:
   receiving the reference signal,
      wherein the RACH message is transmitted on the full-duplex RACH occasion.

5. The method of claim 1, wherein the RACH message is associated with initial access.

6. The method of claim 1, wherein the reference signal resource is for a sounding reference signal.

7. A method of wireless communication performed by a network node, comprising:
   transmitting, to a set of first user equipments (UEs) and based at least in part on an initial access procedure to be performed by a second UE of a set of second UEs that are in communication with the network node, configuration information comprising an uplink reference signal configuration indicating:
a sequence of a periodic uplink reference signal,
parameters for transmission of the periodic uplink reference signal, and
a reference signal resource associated with detecting cross-link interference associated with transmitting a random access channel (RACH) message on full duplex resources, wherein the cross-link interference is between the RACH message and downlink communications of the set of first UEs;
transmitting, to the set of second UEs, remaining minimum system information indicating:
an association, between a time and frequence resource and a spatial resource, associated with the reference signal resource, and
a full-duplex RACH occasion corresponding to the association;
receiving, from the second UE and on the reference signal resource, the RACH message on the full-duplex RACH occasion in a frequency division multiplex (FDM) mode when the first UE does not detect a reference signal associated with a synchronization signal block or a channel state information reference signal beam that overlaps in time with the full-duplex RACH occasion; and
receiving the RACH message on a second RACH occasion in the FDM mode, different from the full-duplex RACH occasion, when the first UE detects the reference signal that overlaps in time with the full-duplex RACH occasion.

8. The method of claim 7, wherein the downlink communications are associated with a threshold priority level.

9. The method of claim 7, wherein the reference signal resource comprises a same set of resources for each of the set of first UEs.

10. The method of claim 7, wherein the reference signal resource occurs every predefined number of slots.

11. The method of claim 7, wherein reference signals configured for another UE of the set of first UEs is associated with a same sequence that is the sequence of the periodic uplink reference signal.

12. The method of claim 7, further comprising:
selecting the set of first UEs based at least in part on at least one of:
the downlink communications being associated with a threshold priority level, the set of first UEs being associated with the downlink communications, or location information associated with the set of first UEs.

13. The method of claim 7, wherein a RACH occasion associated with the RACH message overlaps with a downlink communication resource of the set of first UEs in at least one of: frequency, or spatial configuration.

14. The method of claim 7, further comprising:
performing an initial access operation with the second UE based at least in part on the RACH message.

15. A method of wireless communication performed by a first user equipment (UE), comprising:
receiving, from a network node and based at least in part on the first UE being associated with a downlink communication that has a threshold priority level, configuration information comprising an uplink reference signal configuration indicating:
a sequence of a periodic uplink reference signal,
parameters for transmission of the periodic uplink reference signal, and
a reference signal resource associated with detecting cross-link interference on a downlink communication of the first UE, wherein the cross-link interference is associated with transmission, by a neighbor UE, of a random access channel (RACH) message on full duplex resources;
transmitting a RACH message on a full-duplex RACH occasion in a frequency division multiplex (FDM) mode when the first UE does not detect a reference signal associated with a synchronization signal block or a channel state information reference signal beam that overlaps in time with the full-duplex RACH occasion; and
transmitting the RACH message on a second RACH occasion in the FDM mode, different from the full-duplex RACH occasion, when the first UE detects the reference signal that overlaps in time with the full-duplex RACH occasion.

16. The method of claim 15, wherein the downlink communication is associated with a threshold priority level.

17. The method of claim 15, wherein the reference signal resource occurs every predefined number of slots.

18. The method of claim 15, wherein reference signals configured for first UE are associated with a same sequence that is the sequence of the periodic uplink reference signal.

19. A first user equipment (UE) for wireless communication, comprising:
one or more memories; and
one or more processors, coupled to the one or more memories, configured to:
receive, from a network node, remaining minimum system information indicating:
an association, between a time and frequency resource, and a spatial configuration, associated with a reference signal resource associated with detecting cross-link interference associated with transmitting a random access channel (RACH) message on full duplex resources, and
a full-duplex RACH occasion corresponding to the association;
transmit the RACH message on the full-duplex RACH occasion in a frequency division multiplex (FDM) mode when the first UE does not detect a reference signal, associated with a synchronization signal block or a channel state information reference signal beam, on the reference signal resource that overlaps in time with the full-duplex RACH occasion; and
transmit the RACH message on a second RACH occasion in the FDM mode, different from the full-duplex RACH occasion, when the first UE detects the reference signal that overlaps in time with the full-duplex RACH occasion.

20. The first UE of claim 19, wherein the full-duplex RACH occasion overlaps with a resource for a downlink communication of a neighbor UE to the network node.

21. The first UE of claim 19, wherein the one or more processors are further configured to:
select the full-duplex RACH occasion based at least in part on the channel state information reference signal beam being mapped to the full-duplex RACH occasion.

22. The first UE of claim 19, wherein the one or more processors are further configured to:
receive the reference signal,
wherein the RACH message is transmitted on the full-duplex RACH occasion.

23. The first UE of claim 19, wherein the RACH message is associated with initial access.

24. The first UE of claim 19, wherein the reference signal resource is for a sounding reference signal.

25. The first UE of claim 19, wherein the one or more processors are further configured to:
   perform an initial access operation with a second UE based at least in part on the RACH message.

26. The method of claim 7, wherein the reference signal resource is for a sounding reference signal.

* * * * *